US012450262B2

(12) United States Patent
Shashanka et al.

(10) Patent No.: US 12,450,262 B2
(45) Date of Patent: Oct. 21, 2025

(54) METHOD AND ELECTRONIC DEVICE TO ASSIGN APPROPRIATE SEMANTIC CATEGORIES TO DOCUMENTS WITH ARBITRARY GRANULARITY

(71) Applicant: CONCENTRIC SOFTWARE, INC., Saratoga, CA (US)

(72) Inventors: Madhusudana Shashanka, Austin, TX (US); Leomart Reyes Crisostomo, Sunnyvale, CA (US); Shankar Subramaniam, Cupertino, CA (US)

(73) Assignee: CONCENTRIC SOFTWARE, INC., Saratoga, CA (US)

( * ) Notice: Subject to any disclaimer, the term of this patent is extended or adjusted under 35 U.S.C. 154(b) by 124 days.

(21) Appl. No.: 18/083,522

(22) Filed: Dec. 18, 2022

(65) Prior Publication Data
US 2024/0202215 A1    Jun. 20, 2024

(51) Int. Cl.
*G06F 16/28* (2019.01)
*G06F 18/23213* (2023.01)

(52) U.S. Cl.
CPC ...... *G06F 16/285* (2019.01); *G06F 18/23213* (2023.01)

(58) Field of Classification Search
CPC .............. G06F 16/285; G06F 18/23213
See application file for complete search history.

(56) References Cited

U.S. PATENT DOCUMENTS

| 10,204,143 B1* | 2/2019 | Dub ................. G06F 16/35 |
| 2005/0223313 A1* | 10/2005 | Geraud .............. G06V 30/40 |
| | | 715/255 |
| 2009/0234831 A1* | 9/2009 | Ebadollahi ......... G06Q 30/0201 |
| | | 707/999.005 |

(Continued)

FOREIGN PATENT DOCUMENTS

JP    2003141129 A    *   5/2003

OTHER PUBLICATIONS

EspaceNet English Language Translation of Asakawa (Year: 2003).*

*Primary Examiner* — Apu M Mofiz
*Assistant Examiner* — Farhad Agharahimi
(74) *Attorney, Agent, or Firm* — Evergreen Valley Law Group; Kanika Radhakrishnan

(57) ABSTRACT

Embodiments herein disclose a method for determining at least one semantic category of at least one document using an electronic device 100. The method includes receiving at least one document embedding indicating a semantic representation of at least one document. Further, the method includes determining a probable set of semantic categories of a plurality of semantic categories associated with the document embedding based on an execution of the at least one document embedding on a plurality of proto-models. Further, the method includes receiving the semantic model associated with each of the probable set of semantic categories. Further, the method includes executing the at least one document embedding on the received semantic model. Further, the method includes determining the at least one (Continued)

semantic category out of the probable set of semantic categories, of the at least one document embedding based on the at least one executed document.

18 Claims, 9 Drawing Sheets

(56) References Cited

U.S. PATENT DOCUMENTS

| | | | |
|---|---|---|---|
| 2014/0156567 A1* | 6/2014 | Scholtes | G06N 5/02 |
| | | | 706/12 |
| 2018/0032640 A1* | 2/2018 | Yabuki | G06F 11/34 |
| 2018/0349388 A1* | 12/2018 | Skiles | G06F 16/358 |
| 2021/0083994 A1* | 3/2021 | Pan | G06F 18/23213 |
| 2023/0289522 A1* | 9/2023 | Lakovenko | G06F 40/20 |

* cited by examiner

METHOD AND ELECTRONIC DEVICE TO ASSIGN APPROPRIATE SEMANTIC CATEGORIES TO DOCUMENTS WITH ARBITRARY GRANULARITY

FIELD OF INVENTION

The present disclosure relates to an electronic device, and more specifically related to a method and the electronic device to assign appropriate semantic categories to documents with arbitrary granularity.

BACKGROUND OF INVENTION

Several academic studies and published approaches are available which deals with classifying documents into topics and categories. One straightforward method is to look for specific keywords that are common to a topic/category. There are several disadvantages to this, including the possibility that different topics might have keywords in common. Several topics may not have enough distinct keywords to describe the keywords. Maintaining and managing such keyword sets can quickly become complex to manage, rendering the method impractical.

A more effective framework for automating this task is to treat it as a Machine Learning (ML) problem, collect labelled training data for each topic/category, and build models on it. This is a subfield of machine learning known as Natural Language Processing (NLP). Traditional approaches/methods relied on analysing words within a document(s), extracting features based on the frequency of words within each document, and then training ML models on such features. These approaches/methods have fundamental limitations due to an uncertainty inherent in word granularity. But similar concepts can be expressed with different word sets (synonymy), and the same word can have completely different meanings in different contexts (polysemy). Recent approaches/methods for classification use Deep Learning models such as transformers, which outperform word-based approaches. Starting with a "pre-trained" deep learning model (such as Bidirectional Encoder Representations from Transformers (BERT), Generative Pre-trained Transformer (GPT), etc.) and training it further in a supervised manner with training data is the approach (also referred to as fine-tuning).

Despite a large body of prior arts on the approaches/methods to document categorization, there are few reports or case studies of successfully deployed systems that are actively used in a field. Several practical challenges are primarily to blame for the gap between theory and practice.

a. First, developing a traditional ML categorization system necessitates defining it as a multi-class supervised learning problem. This necessitates a fixed taxonomy for all of the categories/topics, as well as a training dataset of documents for each of them. Creating the fixed taxonomy of a finite set of categories upfront presents great practical challenges. One of the most important is determining a level of granularity for categories. Some categories, such as Legal/non-disclosure agreement (NDA), may have a smaller variety than others, such as Pricing/Invoices. Obtaining an adequate number of training documents for each category is also difficult, if not more difficult. Before even beginning to build the system, these efforts will consume a significant amount of time and resources.

b. Second, the fixed taxonomy of categories and topics will quickly become obsolete. It is almost always the case in all real-world environments that new categories are desired. In this case, an entire model must be retrained from a start, which can be computationally expensive. ML models can make incorrect predictions, and systems frequently include a workflow to flag these false positives. When false positives are labeled in a multi-class classifier, the entire model must be retrained, which is another computationally expensive operation.

c. Finally, whenever new categories are created and updated models are deployed, all documents that were evaluated against previous models must be re-evaluated, making the system expensive and inefficient.

Thus, it is desired to address the above-mentioned disadvantages or other shortcomings or at least provide a useful alternative for assigning appropriate semantic categories to the document(s) with arbitrary granularity.

BRIEF SUMMARY OF THE INVENTION

Accordingly, embodiments herein disclose a method for determining at least one semantic category of at least one document using an electronic device. The method includes receiving, by the electronic device, the at least one document embedding indicating a semantic representation of the at least one document. Further, the method includes determining, by the electronic device, a probable set of semantic categories of a plurality of semantic categories associated with the at least one document embedding based on an execution of the at least one document embedding on a plurality of proto-models, where each proto-model of the plurality of proto-models is a compressed version of a semantic model associated with a respective semantic category. Further, the method includes receiving, by the electronic device, the semantic model associated with each of the probable set of semantic categories. Further, the method includes executing, by the electronic device, the at least one document embedding on the received semantic model. Further, the method includes determining, by the electronic device, the at least one semantic category out of the probable set of semantic categories, of the at least one document embedding based on the at least one executed document.

In an embodiment, each semantic model includes a set of vector embeddings of the at least one document used in training at least one semantic category of the plurality of semantic categories and where the set of vector embeddings is referred to as exemplars.

In an embodiment, where determining, by the electronic device, the probable set of semantic categories of the plurality of semantic categories associated with the at least one document embedding based on the execution of the at least one document embedding on the plurality of proto-models includes determining, by the electronic device, a similarity between the at least one document embedding against one of: a mean exemplar and a centroid exemplar associated with each proto-model of the plurality of proto-models. Further, the method includes determining, by the electronic device, whether the similarity between the at least one document embedding and one of: the mean exemplar and the centroid exemplar associated with each proto-model of the plurality of proto-models is greater than an elimination threshold. Further, the method includes determining, by the electronic device, the probable set of semantic categories corresponding to each proto-model of the plurality of proto-models in response to determining that the similarity between the at least one document embedding and one of: the mean exemplar and the centroid exemplar greater than the elimination threshold.

In an embodiment, the elimination threshold is determined based on a similarity between one of: the mean exemplar and the centroid exemplar, and a farthest exemplar from the centroid exemplar associated with a respective semantic category.

In an embodiment, the semantic model associated with each of the probable set of semantic categories is received from a semantic model database.

In an embodiment, further, the method includes determining, by the electronic device, the at least one semantic category associated with the at least one document is changed to at least one new semantic category; determining, by the electronic device, the at least one semantic category associated with the at least one document is a false positive; and identifying, by the electronic device, the at least one document embedding associated with the at least one document with the at least one new semantic category as an exemplar for the at least one new semantic category.

In an embodiment, further, the method includes determining, by the electronic device, a first semantic category associated with the at least one document is changed to a second semantic category by a user; determining, by the electronic device, a semantic model associated with the first semantic category and a semantic model associated with the second semantic category; and performing, by the electronic device, one of: automatic updating of the semantic model associated with the first semantic category and the semantic model associated with the second semantic category based on the at least one document; and automatic updating of a plurality of semantic models stored in the semantic model database.

In an embodiment, further, the method includes determining, by the electronic device, a first semantic category associated with the at least one document is changed to a second semantic category by a specific user in a multi-user environment; and automatically updated, by the electronic device, the semantic model associated with the first semantic category and the semantic model associated with the second semantic category based on the at least one document only for the specific user; and retaining the semantic model associated with the first semantic category and the semantic model associated with the second semantic category without any change.

In an embodiment, further, the method includes determining, by the electronic device, a plurality of documents where the semantic categories of each of the plurality of documents are determined by one of the semantic model associated with a first semantic category, and the semantic model associated with the second semantic category; executing, by the electronic device, the updated semantic model associated with the first semantic category and the updated semantic model associated with the second semantic category based on the determined plurality of documents; and automatically updating, by the electronic device, the at least one semantic category associated with each of the determined plurality of documents based on the execution.

In an embodiment, further, the method includes determining, by the electronic device, an aggregate of the plurality of semantic models stored in the semantic models database; customizing, by the electronic device, the aggregate of the plurality of semantic models stored based on a user preference, where the customization is one of: enabling at least one semantic model of the plurality of semantic models, disabling the at least one semantic model of the plurality of semantic models, overwriting parameters associated with the at least one semantic model of the plurality of semantic models; and generating, by the electronic device, a new semantic model based on the customization.

Accordingly, embodiments herein disclose the electronic device for determining the at least one semantic category of the at least one document using the electronic device. The electronic device includes a semantic category identifier coupled with a processor and a memory. The semantic category identifier receives the at least one document embedding indicating the semantic representation of the at least one document. The semantic category identifier determines the probable set of semantic categories of the plurality of semantic categories associated with the at least one document embedding based on the execution of the at least one document embedding on the plurality of proto-models, where each proto-model of the plurality of proto-models is the compressed version of the semantic model associated with the respective semantic category. The semantic category identifier receives the semantic model associated with each of the probable set of semantic categories. The semantic category identifier executes the at least one document embedding on the received semantic model. The semantic category identifier determines the at least one semantic category out of the probable set of semantic categories, of the at least one document embedding based on the at least one executed document.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein, and the embodiments herein include all such modifications.

DESCRIPTION OF THE DRAWINGS

This invention is illustrated in the accompanying drawings, throughout which like reference letters indicate corresponding parts in the various figures. The embodiments herein will be better understood from the following description with reference to the drawings, in which.

DETAILED DESCRIPTION OF INVENTION

Figure 1:
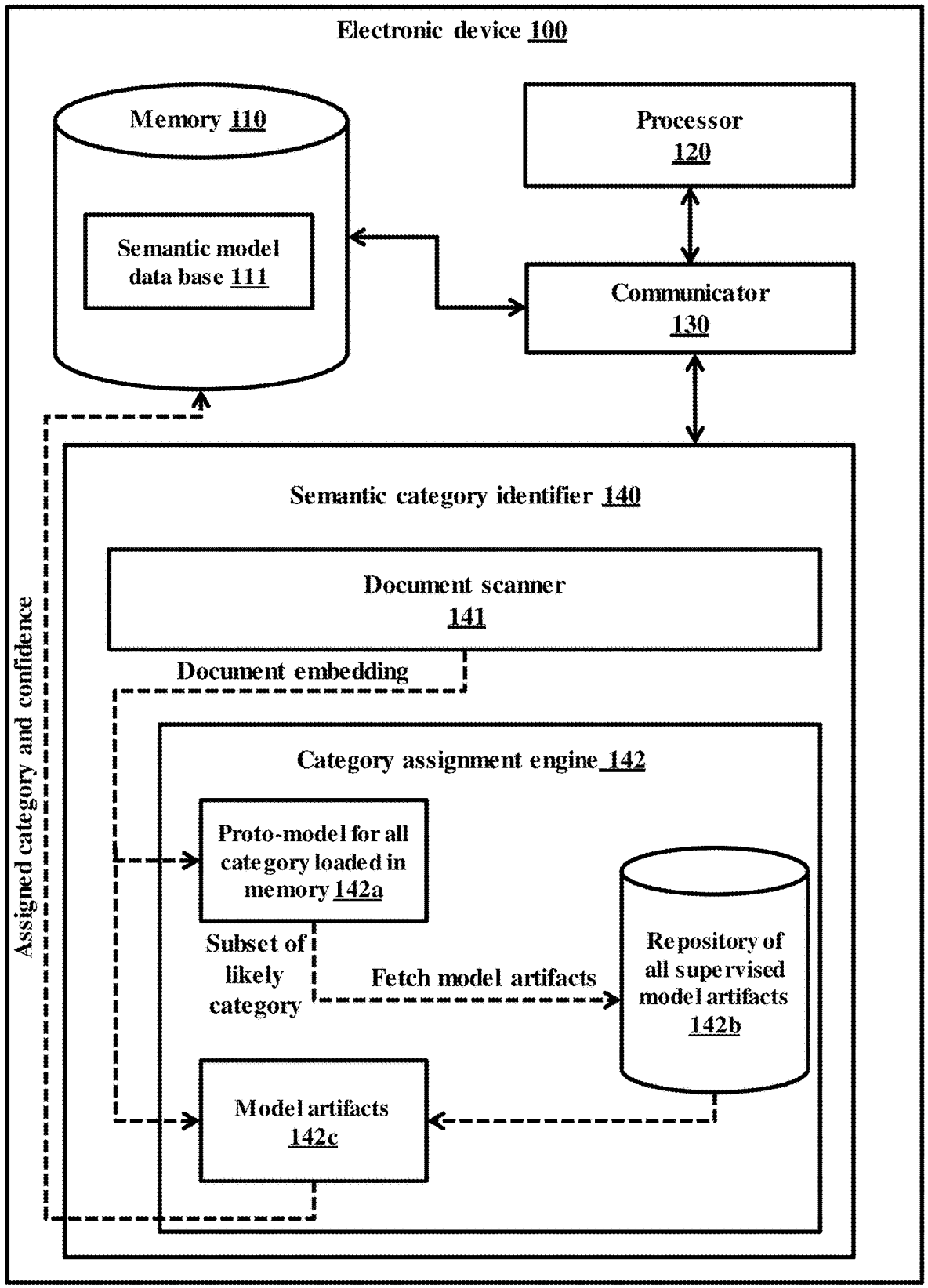
FIG. 1 illustrates a block diagram of an electronic device for determining at least one semantic category of at least one document, according to an embodiment as disclosed herein.

The embodiments herein and the various features and advantageous details thereof are explained more fully with reference to the non-limiting embodiments that are illustrated in the accompanying drawings and detailed in the following description. Descriptions of well-known components and processing techniques are omitted to not obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as units or modules or the like, are physically implemented by analog or digital circuits such as logic gates, integrated circuits, microprocessors, microcontrollers, memory circuits, passive electronic components, active electronic components, optical components, hardwired circuits, or the like, and may optionally be driven by firmware. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the invention. Likewise, the blocks of the embodiments may be physically combined into more complex blocks without departing from the scope of the invention The accompanying drawings are used to help easily understand various technical features and the embodiments presented herein are not limited by the accompanying drawings. As such, the present disclosure should be construed to extend to any alterations, equivalents, and substitutes in addition to those which are particularly set out in the accompanying drawings. Although the terms first, second, etc. may be used herein to describe various elements, these elements should not be limited by these terms. These terms are generally only used to distinguish one element from another.

Identifying a nature of the document(s) and the topic to which it pertains is a critical first step that enables several important enterprise applications. A system is capable of automatically categorizing document(s) into semantic categories and can aid in a variety of applications such as information discovery and search, securing sensitive and business-critical data, and access governance, among others. Knowing what topics/categories a particular document(s) pertains to, in particular in enterprise cyber security, allows security teams to appropriately secure the document(s) by provisioning access for only required users. Metadata of a document (such as the filename, file path, document title, file creation timestamp, file creator, file owner, header/footer markings, and so on) is used by current systems to infer what the document(s) is about. In this invention, the proposed system/electronic device uses the document's semantic meaning to automatically assign it to the appropriate semantic category.

Accordingly, embodiments herein disclose a method for determining at least one semantic category of at least one document using an electronic device. The method includes receiving, by the electronic device, the at least one document embedding indicating a semantic representation of the at least one document. Further, the method includes determining, by the electronic device, a probable set of semantic categories of a plurality of semantic categories associated with the at least one document embedding based on an execution of the at least one document embedding on a plurality of proto-models, where each proto-model of the plurality of proto-models is a compressed version of a semantic model associated with a respective semantic category. Further, the method includes receiving, by the electronic device, the semantic model associated with each of the probable set of semantic categories. Further, the method includes executing, by the electronic device, the at least one document embedding on the received semantic model. Further, the method includes determining, by the electronic device, the at least one semantic category out of the probable set of semantic categories, of the at least one document embedding based on the at least one executed document.

Accordingly, embodiments herein disclose the electronic device for determining the at least one semantic category of the at least one document using the electronic device. The electronic device includes a semantic category identifier coupled with a processor and a memory. The semantic category identifier receives the at least one document embedding indicating the semantic representation of the at least one document. The semantic category identifier determines the probable set of semantic categories of the plurality of semantic categories associated with the at least one document embedding based on the execution of the at least one document embedding on the plurality of proto-models, where each proto-model of the plurality of proto-models is the compressed version of the semantic model associated with the respective semantic category. The semantic category identifier receives the semantic model associated with each of the probable set of semantic categories. The semantic category identifier executes the at least one document embedding on the received semantic model. The semantic category identifier determines the at least one semantic category out of the probable set of semantic categories, of the at least one document embedding based on the at least one executed document.

Unlike existing methods, the proposed method/system allows the electronic device to assign appropriate semantic categories to documents at any desired granularity based on the semantic meaning of the document's content. The system does not require an initial fixed taxonomy of all categories. This allows for the addition or removal of categories after deployment. The categories can be of any granularity.

Which could be as specific as specific types of tax forms or as broad as Legal Agreements.

Unlike existing methods, the proposed method allows the electronic device to deploy a new category model with as few as one labeled document.

Unlike existing methods, the proposed method allows the electronic device to provide an architecture that enables high-precision detection and efficient inference using a hierarchical model representation or proto-models.

Unlike existing methods, the proposed method allows the electronic device to enable seamless labeling of false positives and automatic model refinement or creation of new models if necessary.

Unlike existing methods, the proposed method allows the electronic device to enable creation of an additional model for the same category without a need to modify prior models and all the models together can be deployed without any problems when new training documents are collected for a category for which models already exist.

Referring now to the drawings, and more particularly to FIGS. 1 through 10, where similar reference characters denote corresponding features consistently throughout the figures, there are shown preferred embodiments.

FIG. 1 illustrates a block diagram of an electronic device 100 for determining at least one semantic category of at least one document, according to an embodiment as disclosed herein. Examples of the electronic device 100 include, but are not limited to a smartphone, a tablet computer, a Personal Digital Assistance (PDA), an Internet of Things (IoT) device, a wearable device, etc.

In an embodiment, the electronic device 100 includes a memory 110, a processor 120, a communicator 130, and a semantic category identifier 140.

In an embodiment, the memory 110 includes a semantic model database 111. The semantic model database 111 stores at least one semantic category of at least one document, a plurality of proto-models, a mean exemplar and a centroid exemplar associated with each proto-model of the plurality of proto-models, an elimination threshold, at least one new semantic category, a first semantic category associated with the at least one document is changed to a second semantic category by a user, the first semantic category associated with the at least one document is changed to the second semantic category by a specific user in a multi-user environment, an aggregate of the plurality of semantic models, and a new semantic model based on the customization. The memory 110 stores instructions to be executed by the processor 120. The memory 110 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 110 may, in some examples, be considered a non-transitory storage medium. The term "non-transitory" may indicate that the storage medium is not embodied in a carrier wave or a propagated signal. However, the term "non-transitory" should not be interpreted that the memory 110 is non-movable. In some examples, the memory 110 can be configured to store larger amounts of information than the memory. In certain examples, a non-transitory storage medium may store data that can, over time, change (e.g., in Random Access Memory (RAM) or cache). The memory 110 can be an internal storage unit or it can be an external storage unit of the UE (100), a cloud storage, or any other type of external storage.

The processor 120 communicates with the memory 110, the communicator 130, and the display (140). The processor 120 is configured to execute instructions stored in the memory 110 and to perform various processes. The processor 120 may include one or a plurality of processors, a general-purpose processor, such as a central processing unit (CPU), an application processor (AP), or the like, a graphics-only processing unit such as a graphics processing unit (GPU), a visual processing unit (VPU), and/or an Artificial intelligence (AI) dedicated processor such as a neural processing unit (NPU).

The communicator 130 is configured for communicating internally between internal hardware components and with external devices (e.g. another electronic device, server, etc.) via one or more networks (e.g. Radio technology). The communicator 130 includes an electronic circuit specific to a standard that enables wired or wireless communication.

The semantic category identifier 140 is implemented by processing circuitry such as logic gates, integrated circuits, microprocessors, microcontrollers, memory circuits, passive electronic components, active electronic components, optical components, hardwired circuits, or the like, and may optionally be driven by firmware. The circuits may, for example, be embodied in one or more semiconductor chips, or on substrate supports such as printed circuit boards and the like.

In an embodiment, the semantic category identifier 140 receives the at least one document embedding indicating a semantic representation of the at least one document. The semantic category identifier 140 determines a probable set of semantic categories of a plurality of semantic categories associated with the at least one document embedding based on an execution of the at least one document embedding on the plurality of proto-models, where each proto-model of the plurality of proto-models is a compressed version of a semantic model associated with a respective semantic category. Each semantic model includes a set of vector embeddings of the at least one document used in training at least one semantic category of the plurality of semantic categories and where the set of vector embeddings is referred to as exemplars. The semantic model associated with each of the probable set of semantic categories is received from the semantic model database 111.

The semantic category identifier 140 receives the semantic model associated with each of the probable set of semantic categories. The semantic category identifier 140 executes the at least one document embedding on the received semantic model. The semantic category identifier 140 determines the at least one semantic category out of the probable set of semantic categories, of the at least one document embedding based on the at least one executed document.

The semantic category identifier 140 determines a similarity between the at least one document embedding against one of: the mean exemplar and the centroid exemplar associated with each proto-model of the plurality of proto-models. The semantic category identifier 140 determines whether the similarity between the at least one document embedding and one of: the mean exemplar and the centroid exemplar associated with each proto-model of the plurality of proto-models is greater than the elimination threshold. The elimination threshold is determined based on a similarity between one of: the mean exemplar and the centroid exemplar, and a farthest exemplar from the centroid exemplar associated with a respective semantic category. The semantic category identifier 140 determines the probable set of semantic categories corresponding to each proto-model of the plurality of proto-models in response to determining that the similarity between the at least one document embedding and one of: the mean exemplar and the centroid exemplar is greater than the elimination threshold.

The semantic category identifier 140 determines the at least one semantic category associated with the at least one document is changed to the at least one new semantic category. The semantic category identifier 140 determines the at least one semantic category associated with the at least one document is a false positive. The semantic category identifier 140 identifies the at least one document embedding associated with the at least one document with the at least one new semantic category as an exemplar for the at least one new semantic category.

The semantic category identifier 140 determines the first semantic category associated with the at least one document is changed to the second semantic category by the user. The semantic category identifier 140 determines a semantic model associated with the first semantic category and a semantic model associated with the second semantic category. The semantic category identifier 140 performs one of: automatic updating of the semantic model associated with the first semantic category and the semantic model associated with the second semantic category based on the at least one document; and automatic updating of the plurality of semantic models stored in the semantic models database 111.

The semantic category identifier 140 determines the first semantic category associated with the at least one document is changed to the second semantic category by the specific user in the multi-user environment. The semantic category identifier 140 automatically updates the semantic model associated with the first semantic category and the semantic model associated with the second semantic category based on the at least one document only for the specific user and retaining the semantic model associated with the first semantic category and the semantic model associated with the second semantic category without any change.

The semantic category identifier 140 determines a plurality of documents where the semantic categories of each of the plurality of documents are determined by one of the semantic models associated with the first semantic category and the semantic model associated with the second semantic category. The semantic category identifier 140 executes the updated semantic model associated with the first semantic category and the updated semantic model associated with the second semantic category based on the determined plurality of documents. The semantic category identifier 140 automatically updates the at least one semantic category associated with each of the determined plurality of documents based on the execution.

The semantic category identifier 140 determines the aggregate of the plurality of semantic models stored in the semantic models database 111. The semantic category identifier 140 customizes the aggregate of the plurality of semantic models stored based on a user preference, where the customization is one of: enabling at least one semantic model of the plurality of semantic models, disabling the at least one semantic model of the plurality of semantic models, overwriting parameters associated with the at least one semantic model of the plurality of semantic models. The semantic category identifier 140 generates the new semantic model based on the customization.

In an embodiment, the semantic category identifier 140 includes a document scanner 141 and a category assignment engine 142. The document scanner 141 receives the at least one document embedding indicating the semantic representation of the at least one document. The category assignment engine 142 can be realized as an API, a micro service, or as a batch computation.

The category assignment engine 142 compares a document embedding (numeric representation of the document as a vector) against proto-models 142a (hierarchical model representations) for all categories loaded in the memory 110. These model representations can be the average embedding (also referred to alternately as the centroid) in one embodiment, a linkage matrix (a data structure obtained by performing hierarchical clustering) in another embodiment, or more complex data structures like a tree data structure. These proto-models 142a can all be loaded in the memory 110 or be loaded as "memory-mapped" from disk storage. As a result of the embedding's comparison to the proto-models 142a, outputs a set of likely models that the embedding might belong to. Model artifacts 142c for this set of likely models are retrieved from a database (i.e. Repository of all supervised model artifacts 142b), loaded in the memory 110 (or as memory-mapped data structures from the model artifacts 142c on the memory disk) and the embedding compared against them. Each model artifact 142c is a set of vector embeddings of documents that were used in a training dataset for a particular category, these embeddings are referred to as exemplars. The comparison yields the exemplar closest to the document embedding, the exemplar's category, and a measure of similarity between the embedding and a closest exemplar. If a similarity exceeds a predetermined threshold (elimination threshold), the embedding is assigned to that particular category.

The category assignment engine 142 determines the at least one semantic category associated with the at least one document is changed to the at least one new semantic category. The category assignment engine 142 determines the at least one semantic category associated with the at least one document is the false positive. The category assignment engine 142 identifies the at least one document embedding associated with the at least one document with the at least one new semantic category as the exemplar for the at least one new semantic category.

The category assignment engine 142 determines the first semantic category associated with the at least one document is changed to the second semantic category by the user. The category assignment engine 142 determines the semantic model associated with the first semantic category and the semantic model associated with the second semantic category. The category assignment engine 142 performs one of: automatic updating of the semantic model associated with the first semantic category and the semantic model associated with the second semantic category based on the at least one document; and automatic updating of the plurality of semantic models stored in the semantic models database 111.

The category assignment engine 142 determines the first semantic category associated with the at least one document is changed to the second semantic category by the specific user in the multi-user environment. The category assignment engine 142 automatically updates the semantic model associated with the first semantic category and the semantic model associated with the second semantic category based on the at least one document only for the specific user, and retaining the semantic model associated with the first semantic category and the semantic model associated with the second semantic category without any change.

The category assignment engine 142 determines the plurality of documents where the semantic categories of each of the plurality of documents are determined by one of the semantic model associated with the first semantic category and the semantic model associated with the second semantic category. The category assignment engine 142 executes the updated semantic model associated with the first semantic category and the updated semantic model associated with the second semantic category based on the determined plurality of documents. The category assignment engine 142 automatically updates the at least one semantic category associated with each of the determined plurality of documents based on the execution.

The category assignment engine 142 determines the aggregate of the plurality of semantic models stored in the semantic models database 111. The category assignment engine 142 customize the aggregate of the plurality of semantic models stored based on the user preference, where the customization is one of: enabling the at least one semantic model of the plurality of semantic models, disabling the at least one semantic model of the plurality of semantic models, overwriting parameters associated with the at least one semantic model of the plurality of semantic models.

At least one of the plurality of modules may be implemented through an AI model. A function associated with the AI model may be performed through the non-volatile memory, the volatile memory, and the processor (120). One or a plurality of processors controls the processing of the input data in accordance with a predefined operating rule or AI model stored in the non-volatile memory and the volatile memory. The predefined operating rule or AI model is provided through training or learning. Here, being provided through learning means that, by applying a learning algorithm to a plurality of learning data, a predefined operating rule or AI model of the desired characteristic is made. The learning may be performed in a device itself in which AI according to an embodiment is performed, and/o may be implemented through a separate server. The learning algorithm is a method for training a predetermined target device (for example, a robot) using a plurality of learning data to cause, allow, or control the target device to decide or predict. Examples of learning algorithms include, but are not limited to, supervised learning, unsupervised learning, semi-supervised learning, or reinforcement learning.

The AI model may consist of a plurality of neural network layers. Each layer has a plurality of weight values and performs a layer operation through a calculation of a previous layer and an operation of a plurality of weights. Examples of neural networks include, but are not limited to, Transformers, Attention Networks, Convolutional Neural Network (CNN), Deep Neural Network (DNN), Recurrent Neural Network (RNN), Restricted Boltzmann Machine (RBM), Deep Belief Network (DBN), Bidirectional Recurrent Deep Neural Network (BRDNN), Generative Adversarial Networks (GAN), and deep Q-networks.

Although the FIG. 1 shows various hardware components of the electronic device 100 but it is to be understood that other embodiments are not limited thereon. In other embodiments, the electronic device 100 may include less or more number of components. Further, the labels or names of the components are used only for illustrative purpose and does not limit the scope of the invention. One or more components can be combined to perform same or substantially similar function to determine the at least one semantic category of the at least one document using the electronic device 100.

Figure 2:
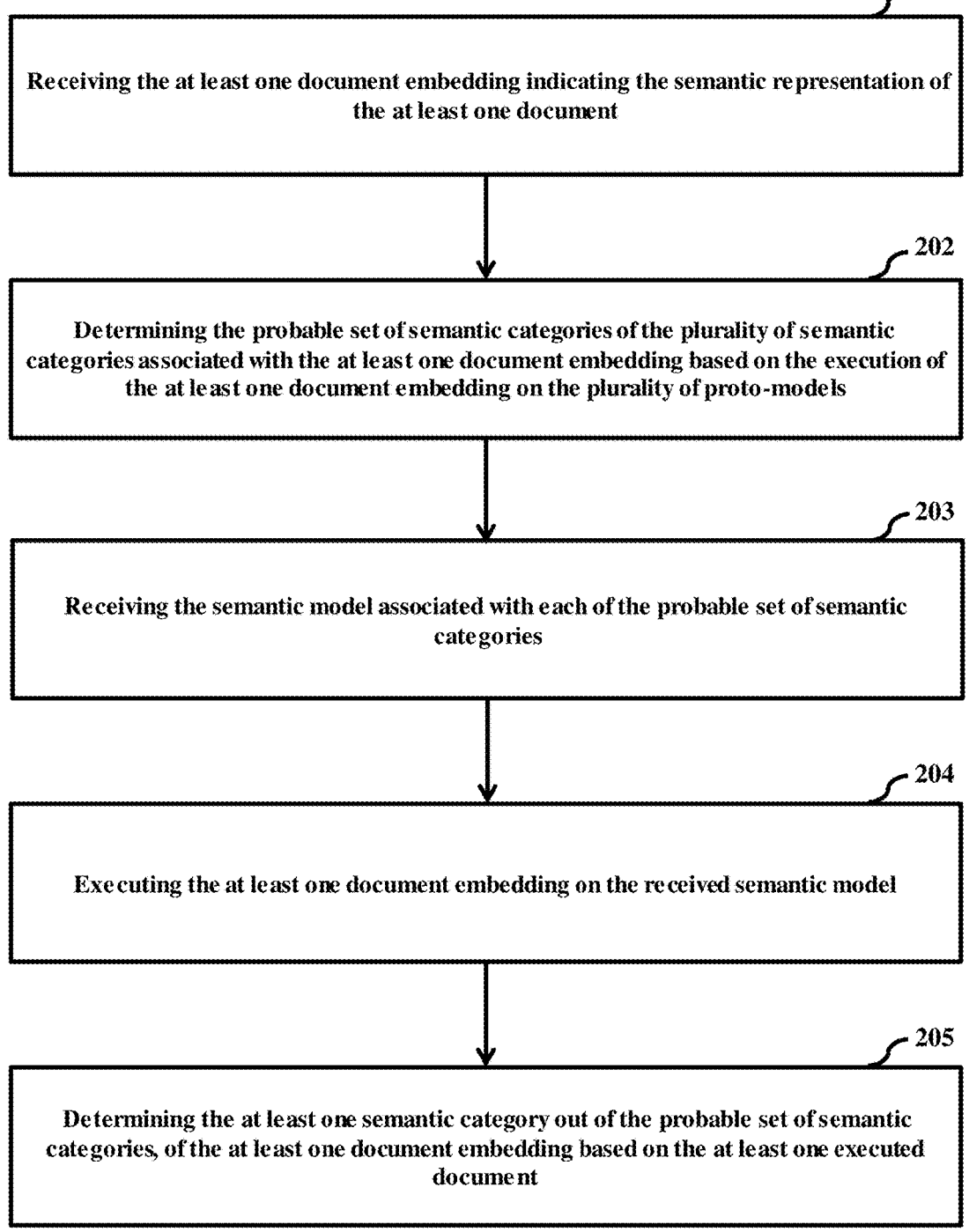
FIG. 2 is a flow diagram illustrating a method for determining the at least one semantic category of the at least one document, according to an embodiment as disclosed herein.

FIG. 2 is a flow diagram 200 illustrating a method for determining the at least one semantic category of the at least one document, according to an embodiment as disclosed herein. The electronic device 100 performs various steps to determine the at least one semantic category of the at least one document.

At step 201, the method includes receiving the at least one document embedding indicating the semantic representation of the at least one document. At step 202, the method includes determining the probable set of semantic categories of the plurality of semantic categories associated with the at least one document embedding based on the execution of the at least one document embedding on the plurality of proto-models, where each proto-model of the plurality of proto-models is the compressed version of the semantic model associated with the respective semantic category. At step 203, the method includes receiving the semantic model associated with each of the probable sets of semantic categories. At step 204, the method includes executing the at least one document embedding on the received semantic model. At step 205, the method includes determining the at least one semantic category out of the probable set of semantic categories, of the at least one document embedding based on the at least one executed document.

Figure 3:
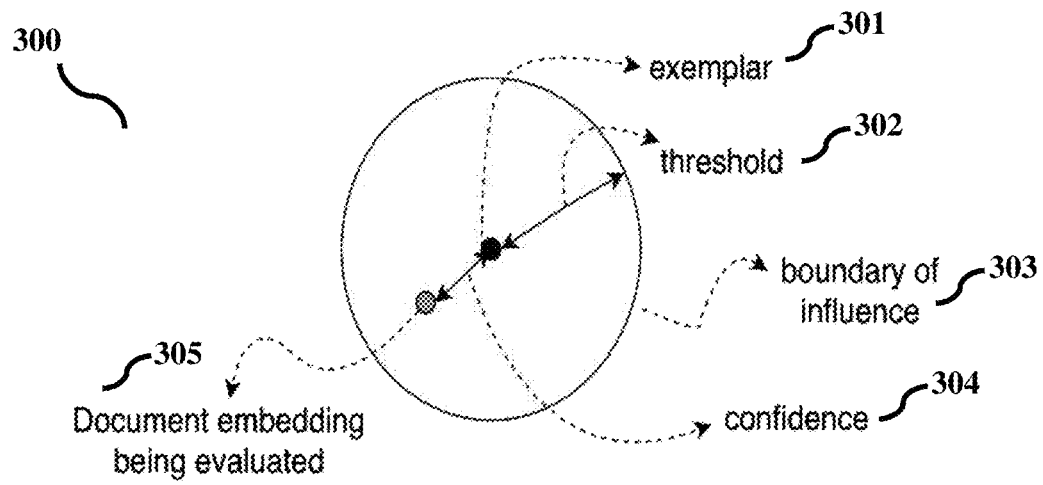
FIG. 3 illustrates a visual representation of an exemplar, according to an embodiment as disclosed herein.

FIG. 3 illustrates a visual representation of the exemplar 301, according to an embodiment as disclosed herein.

A model (exemplar model) 300 for a category is a set of semantic embeddings of documents 305 that are part of the training dataset for that particular category. Each embedding is referred to as the exemplar 301, a multi-dimensional vector (512 dimensions in our specific implementation). The exemplar 301 is a point in high-dimensional space as shown in FIG. 3. In the high-dimensional space, a distance threshold 302 determines a "boundary of influence" 303 of the exemplar 301 and the distance threshold is model-specific. Any new embedding within the "boundary of influence" 303 will be assigned to the category represented by the exemplar 301 (unless it is closed with higher similarity to another exemplar of a different category). The proximity or closeness of the embedding to the exemplar 301 indicates a confidence 304, the closer the embedding 305 is to the exemplar 301, the higher the confidence 304.

Figure 4:
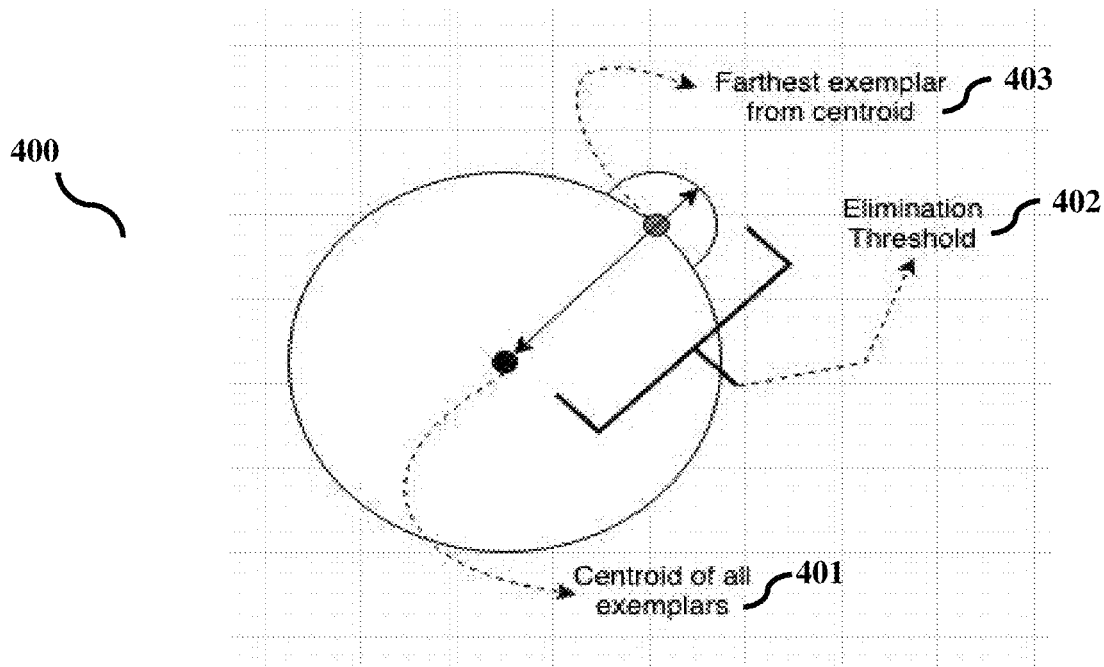
FIG. 4 illustrates a visual representation of a proto-model, according to an embodiment as disclosed herein.

FIG. 4 illustrates a visual representation of a proto-model 400, according to an embodiment as disclosed herein.

In this embodiment, the mean embedding or centroid of all the exemplars 401 is stored as part of the proto-model, shown by a black point. In addition, the elimination threshold 402 is stored as well, which is computed from the centroid's similarity to the farthest exemplar 403 (least similar) from the centroid and combining that with a model threshold. During an initial stage of category assignment for an embedding, it is compared against the proto-model (i.e. the centroid 401) first to compute the similarity. If the embedding's similarity is less than the elimination threshold 402, it is no longer necessary to evaluate the embedding against each of the exemplars and several categories can be eliminated this way from further evaluation.

Figure 5:
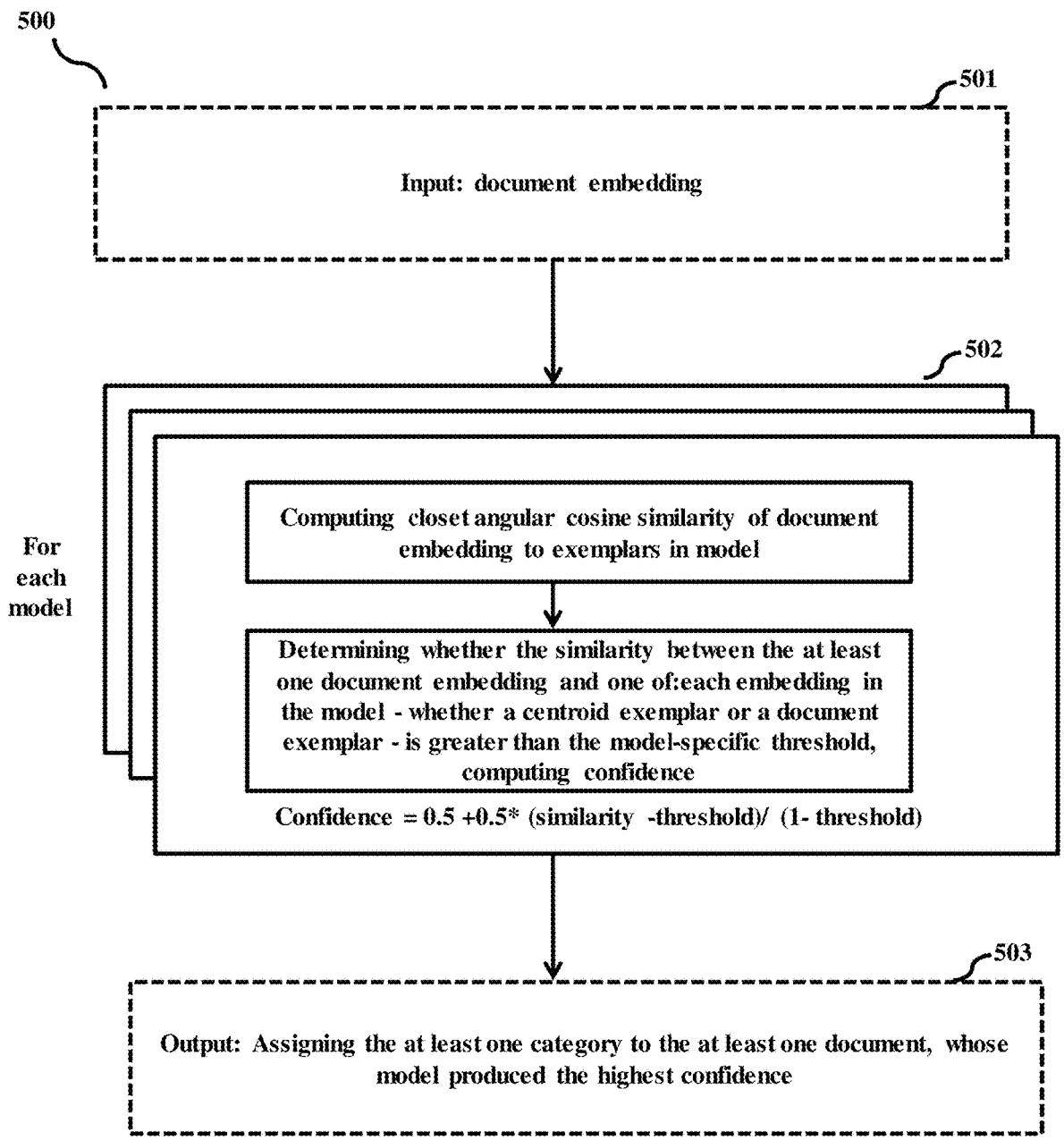
FIG. 5 illustrates a summarized process by which an embedding is assigned to a specific category, according to an embodiment as disclosed herein.

FIG. 5 illustrates a summarized process 500 by which an embedding is assigned to a specific category, according to an embodiment as disclosed herein. The electronic device 100 performs various steps in the summarize process 500.

At step 501, the method includes receiving the at least one document embedding indicating the semantic representation of the at least one document. At step 502, the method includes computing a closet angular cosine similarity of document embedding to the exemplars for each model and determining whether the similarity between the at least one document embedding and one of each erbeddings in the rodel—whether a centroid exemplar or a document exemplar—is greater than the model-specific threshold (highest similarity is noted). A specific formula used to compute similarity is given by the below equation, $$sim(u, v) = \left(1 - \arccos\left(\frac{u \cdot v}{\|u\| \|v\|}\right)\Big/\pi\right) \quad (1)$$

In another example embodiment, the similarity is computed against any point within a hyperplane region with corners specified by any subset of exemplars in the model.

Furthermore, different models may have different similarity thresholds. For models where the highest similarity is greater than the threshold, the similarity is converted to confidence by using the below equation, $$\text{Confidence} = 0.5 + 0.5*(\text{similarity} - \text{threshold})/(1 - \text{threshold}) \quad (2)$$

Figure 6:
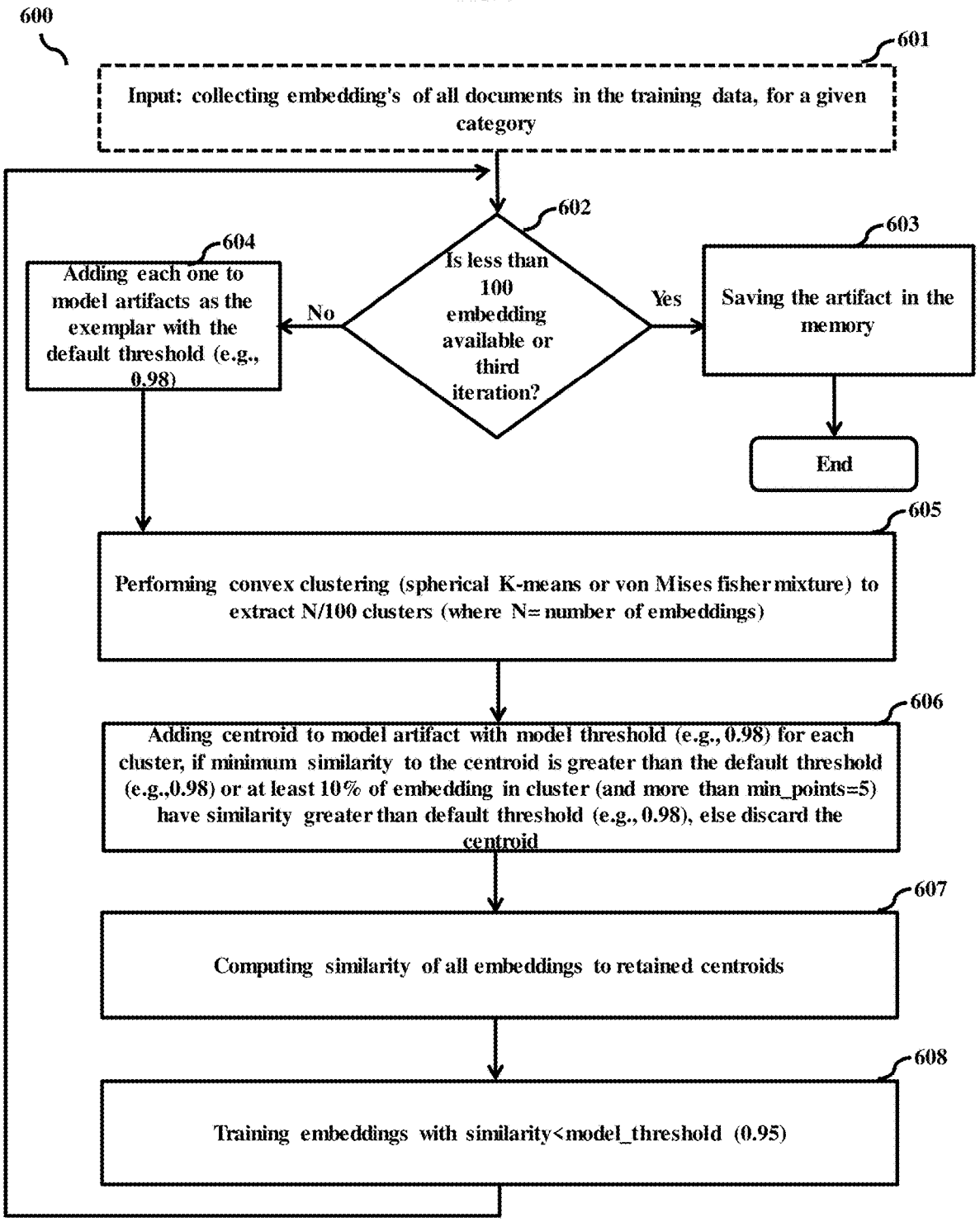
FIG. 6 is a flow diagram illustrating a method for creating a new model artifact from training data, according to an embodiment as disclosed herein.

At step 503, the method includes assigning the at least one category to the at least one document, whose model produced the highest confidence FIG. 6 is a flow diagram 600 illustrating a method for creating a new model artifact from the training data, according to an embodiment as disclosed herein. The electronic device 100 performs various steps to create the new model artifact from the training data. Numerical values shown and choices for a clustering mechanism are for illustrative purposes and can be chosen or modified appropriately based on the specific category under consideration and empirical analysis.

At step 601, the method includes collecting embedding of all documents in the training data, for a given category. At step 602, the method includes determining whether the collected embedding of all documents is lesser than 100 embeddings available or third iteration. At step 603, the method includes saving the artifact in the memory 110 in response to determining that the collected embedding of all documents is lesser than 100 embedding available or third iteration, then end the process. At step 604, the method includes adding each one to model artifacts as the exemplar with the default threshold (e.g., 0.98) in response to determining that the collected embedding's of all documents is not lesser than 100 embedding available or third iteration. The default threshold is applicable to the complete model of the electronic device 100.

At step 605, the method includes performing convex clustering (e.g., spherical K-means or von Mises fisher mixture) to extract N/100 clusters (where N=number of embeddings). At step 606, the method includes adding the centroid to the model artifact with the model threshold (e.g., 0.98) for each cluster, if the minimum similarity to the centroid is greater than the default threshold (e.g., 0.98) or at least 10% of embedded in a cluster (and more than min_points=5) have similarity greater than default threshold (e.g., 0.98), else discard the centroid. At step 607, the method includes computing the similarity of all embeddings to retained centroids. At step 608, the method includes determining whether training embeddings with similarity are less than the model threshold (0.95). Steps 602 to 608 perform again in response to determining that the raining embeddings with similarity are less than the model threshold, else end the process. The centroid represents several exemplars, so the model threshold is moderated so the centroid carries a "wider boundary of influence" compared to the boundary of influence of a single exemplar. By default, the model threshold is set to a value of 0.95 as opposed to 0.98 (as mentioned in the step 606 as the default threshold) for a single exemplar.

There are three major types of models, (a) client-specific models, (b) deployer trained models, and (c) cross-client models. The client-specific models created from documents that are labeled in a client environment are effective only for that client (user) and will take precedence over the deployer-trained models which are made available to all clients. Any document can be assigned a category label by the client. When that happens, the electronic device 100 will create a new model for that category (if it does not exist) and use the embedding of the labeled document(s) as the exemplar. If the model for the category already exists, the embedding of the labeled document(s) is added to the existing exemplars. If the document(s) embedding has a similarity greater than the model threshold for one such client-labeled model, the document(s) will be assigned to the category even if there is another deployer-trained model for which the embedding's similarity (and confidence) might be higher. The deployer trained models and the cross-client models are deployed to all users. The deployer trained models represent models that are trained by the deployer whereas the cross-client models were aggregated from one or more users where similar documents were assigned the same category label by different users.

Figure 7:
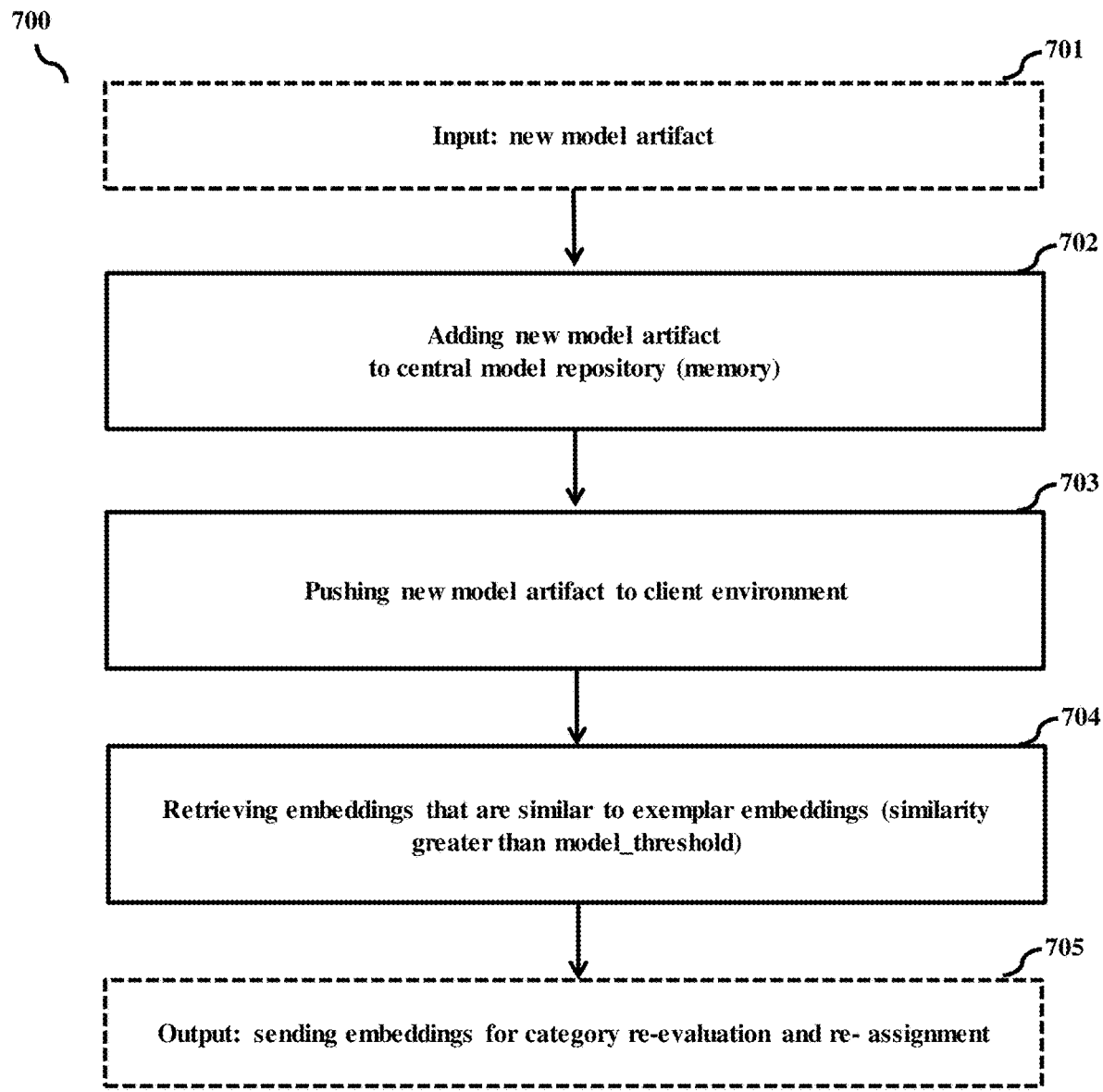
FIG. 7 is a flow diagram illustrating a method for deploying a new model, according to an embodiment as disclosed herein.

FIG. 7 is a flow diagram 700 illustrating a method for deploying the new model, according to an embodiment as disclosed herein. The electronic device 100 performs various steps to deploy the new model.

At step 701, the method includes receiving a new model artifact or in another word, detecting a new model artifact. At step 702, the method includes adding the received model artifact to a central model repository (memory 110). At step 703, the method includes pushing the new model artifact to the client environment. In a given client's environment, all the embeddings of documents found are stored in the database (memory 110). At step 704, the method includes retrieving embeddings that are similar to exemplar embeddings (similarity greater than the model threshold). At step 705, the method includes sending embeddings for category re-evaluation and re-assignment, when the similarity is greater than the model's threshold to any of the exemplars in the model artifact.

Figure 8:
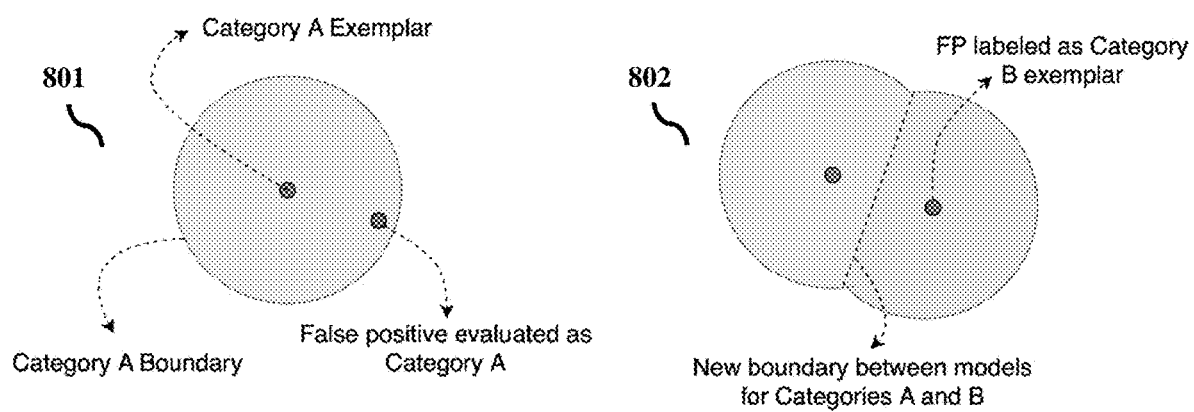
FIG. 8 illustrates a visual description of what happens when the at least one document labeled with an incorrect category (Category A) is corrected by labelling it with a correct category (Category B), according to an embodiment as disclosed herein.

FIG. 8 illustrates a visual description of what happens when the at least one document labeled with an incorrect category (e.g., category A/the at least one semantic category) 801 is corrected by labeling it with a correct category (e.g., category B/the at least one new semantic category) 802, according to an embodiment as disclosed herein.

When the at least one document is assigned to the incorrect category (category A) 801 is fixed by labeling the incorrect category (category A) 801 with the correct category (category B) 802. The at least one document shown by a pink dot in a left panel is assigned to the category A 801 because the embedding exists within a boundary of influence of an exemplar that belongs to the category A 801 (a blue point). As soon as it is labeled, the embedding itself becomes a new exemplar for the category B 802 as shown in a right panel. From that point onwards, other documents similar to it (the pink dot) will no longer be assigned category A 801 (blue) but will instead be correctly assigned to the category B 802 (pink).

FIG. 8 also illustrates how the method/electronic device 100 can implement models with arbitrary granularity. If two documents are semantically quite similar but there is a requirement to distinguish them as two separate categories, just the fact of labeling them into these different categories achieves the desired result, irrespective of the choice of threshold parameters for these models. Whenever a new embedding is evaluated, it is assigned to one of the two categories based on which exemplar it is closest to. The two different categories can be represented by documents whose embeddings are arbitrarily close, as long as they are different.

Figure 9:
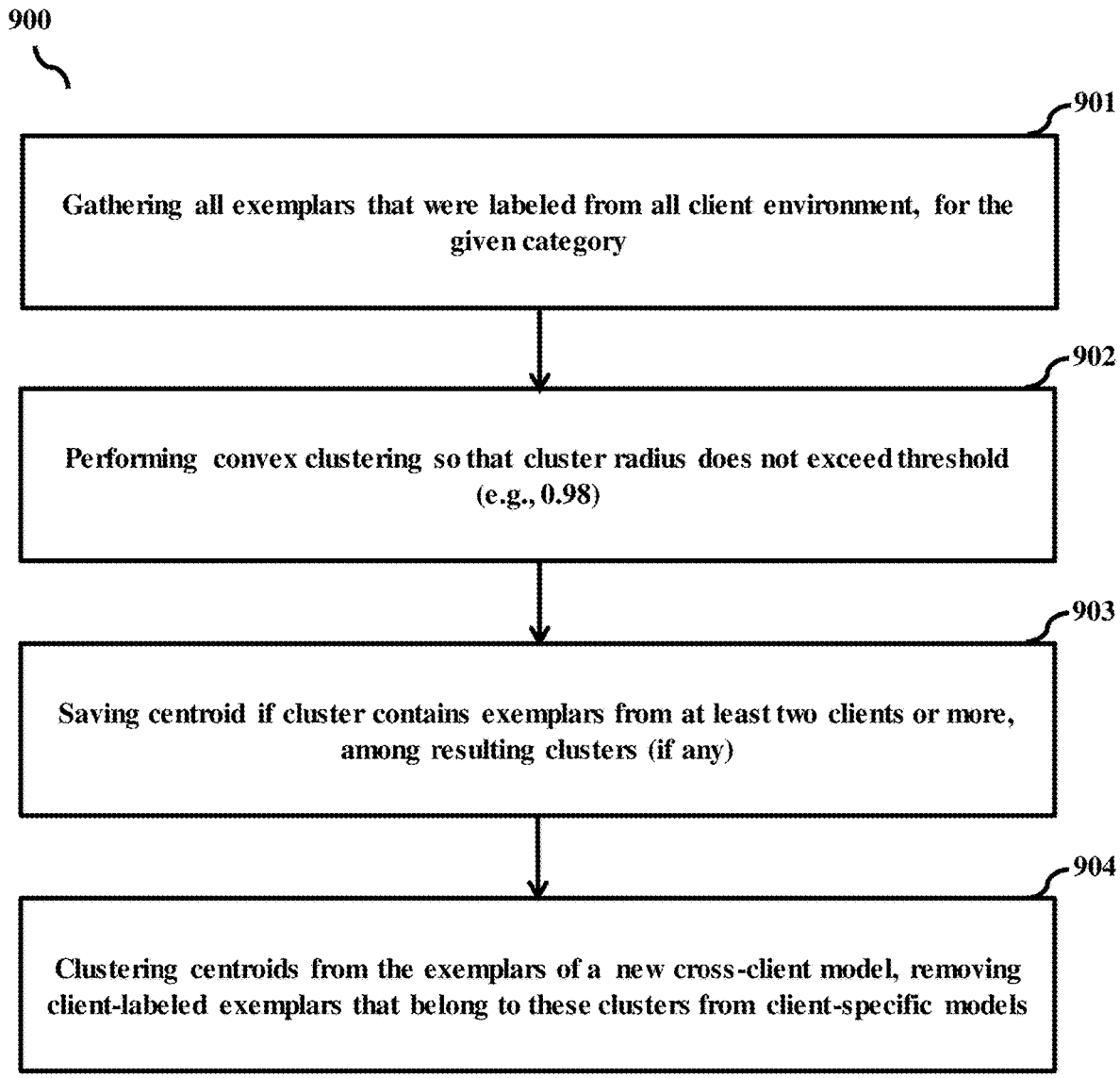
FIG. 9 is a flow diagram illustrating a method for creating cross-client models, according to an embodiment as disclosed herein.

FIG. 9 is a flow diagram 900 illustrating a method for creating cross-client models, according to an embodiment as disclosed herein. The electronic device 100 performs various steps to create the cross-client models. When at least one document is labeled in the client's environment, it is embedding as the category's model exemplar within that client environment is immediately made available. However, it is not recommended to use that model in other client environments. This will assist the electronic device 100 in avoiding situations where the label provided was a user error, which the user does not want to propagate across all client environments. To increase confidence that the labelling was not done in error, the electronic device 100 examines whether very similar documents received the same label from at least one other client. If this occurs, similar examples from two or more clients are combined (the embodiment shown chooses a clustering method to combine them) and the final representation is deployed as the cross-client model to all clients.

At step 901, the method includes gathering all exemplars that were labeled from all client environments, for the given category. At step 902, the method includes performing convex clustering so that the cluster radius does not exceed the threshold (e.g., 0.98). At step 903, the method includes saving the centroid if the cluster contains exemplars from at least two clients or more, among resulting clusters (if any). At step 904, the method includes clustering centroids from the exemplars of a new cross-client model, removing client-labeled exemplars that belong to these clusters from client-specific models.

Figure 10:
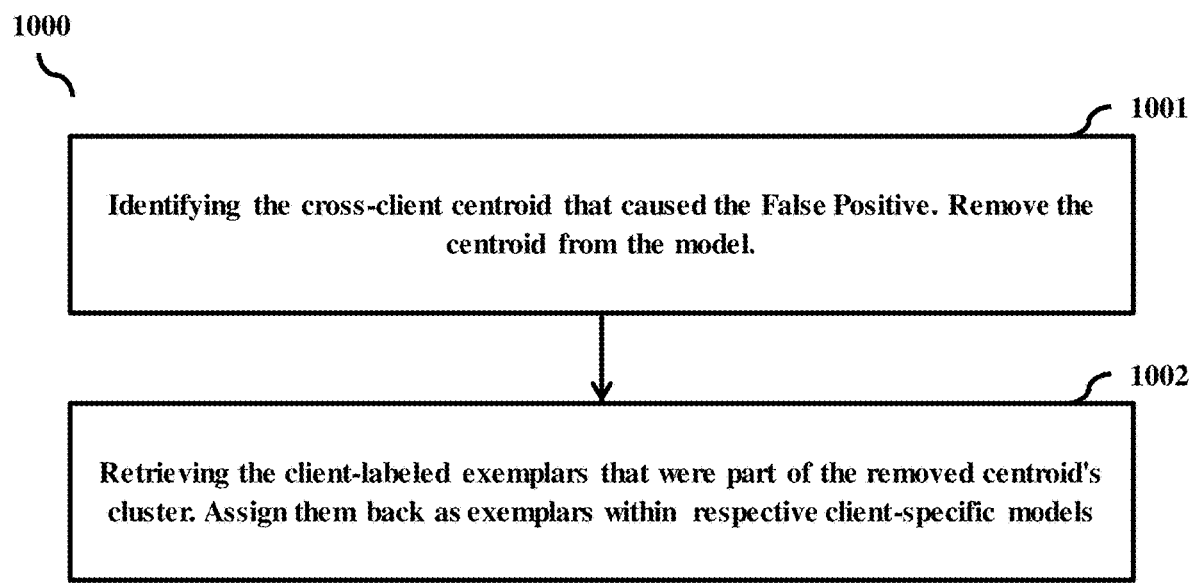
FIG. 10 is a flow diagram illustrating a method for creating cross-client models, according to another embodiment as disclosed herein.

FIG. 10 is a flow diagram 1000 illustrating a method for creating cross-client models, according to another embodiment as disclosed herein. The electronic device 100 performs various steps to create the cross-client models.

At step 1001, if the at least one document assigned to some category is relabeled by the user to a different category, the electronic device 100 takes that as the false positive and uses the labeled document's embedding as an exemplar for the newly labeled category. If the original category assignment occurred due to a cross-client model, the electronic device 100 takes a few additional steps. The electronic device 100 modifies the cross-client model by removing the centroid exemplar that caused the false positive. At step 1002, the electronic device 100 retrieves all the client-labeled exemplars that were part of the removed centroid's cluster (and removed from client-specific models) and assigns them back as exemplars in the respective client-specific models.

The various actions, acts, blocks, steps, or the like in the flow diagrams 200, 500, 600, 700, 900, and 1000 may be performed in the order presented, in a different order or simultaneously. Further, in some embodiments, some of the actions, acts, blocks, steps, or the like may be omitted, added, modified, skipped, or the like without departing from the scope of the invention.

The proposed invention describes a novel method and electronic device 100 for assigning appropriate semantic categories to documents based on the semantic meaning of the document's content at any desired granularity. The proposed method and electronic device 100 do not require a fixed taxonomy of all categories to be specified upfront. This allows for the addition or removal of categories after deployment. Furthermore, the categories can be of any granularity. It could be as granular as specific types of tax forms for example and as broad as Legal Agreements. The proposed method and electronic device 100 are unique in that a new category model can be deployed with as little as one labeled document.

Furthermore, the proposed method and electronic device 100 allow for high-precision detection and efficient inference based on a hierarchical model representation or proto-models. The proposed method and electronic device 100 also allow for seamless labeling of the false positives and automatic model refinement or creation of new models if necessary.

Furthermore, the proposed method and electronic device 100 allow the creation of an additional model for the same category without the need to modify prior models and all the models together can be deployed without any problems when new training documents are collected for the category for which models already exist, In one embodiment, all the model artifacts created are stored in a centralized repository to create a model marketplace. The users from any client can enable or disable any set of models from a collection of all models available in the marketplace. This is accomplished through the use of a flag that indicates whether a model should be enabled in that client environment. The users can also disable a deployed model from their environment at any point in time by setting the flag to false. Advanced users can choose to override parameter values for any of the models during onboarding.

The embodiments disclosed herein can be implemented using at least one hardware device and performing network management functions to control the elements.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the scope of the embodiments as described herein.

What is claimed is:

1. A method for automatically assigning at least one semantic category of at least one document using an electronic device, wherein the method comprises:
receiving, by the electronic device, the at least one document embedding indicating a semantic representation of the at least one document;
determining, by the electronic device, a probable set of semantic categories of a plurality of semantic categories associated with the at least one document embedding based on an execution of the at least one document embedding on a plurality of proto-models, wherein each proto-model of the plurality of proto-models is a compressed version of a semantic model associated with a respective semantic category, wherein each semantic model comprises a set of vector embeddings of the at least one document used in training at least one semantic category of the plurality of semantic categories;

receiving, by the electronic device, the semantic model associated with each of the probable set of semantic categories;

executing, by the electronic device, the at least one document embedding on the received semantic model, wherein executing the at least one document embedding on the received semantic model comprises:

determining similarity between the at least one document embedding and each embedding of the received semantic model;

determining whether the highest similarity among the similarity between the at least one document embedding and each embedding of the received semantic model, is greater than a model threshold; and converting the highest similarity for each received semantic model that has the highest similarity greater than the respective model threshold, into a confidence score, wherein the confidence score is computed based on a difference between the highest similarity and the respective model threshold, wherein the confidence score is computed as:

Confidence score=$0.5+0.5*(HS-Th)/(1-Th)$ wherein HS is the highest similarity for each received semantic model that has the highest similarity greater than the respective model threshold, and wherein Th is the respective model threshold; and automatically assigning, by the electronic device, the at least one semantic category out of the probable set of semantic categories, of the at least one document embedding, wherein the at least one semantic category is associated with the received semantic model that has the highest confidence score.

2. The method as claimed in claim 1, wherein determining, by the electronic device, the probable set of semantic categories of the plurality of semantic categories associated with the at least one document embedding based on the execution of the at least one document embedding on the plurality of proto-models comprises:

determining, by the electronic device, a similarity between the at least one document embedding against one of: a mean exemplar and a centroid exemplar associated with each proto-model of the plurality of proto-models;

determining, by the electronic device, whether the similarity between the at least one document embedding and one of: the mean exemplar and the centroid exemplar associated with each proto-model of the plurality of proto-models is greater than an elimination threshold; and determining, by the electronic device, the probable set of semantic categories corresponding to each proto-model of the plurality of proto-models in response to determining that the similarity between the at least one document embedding and one of: the mean exemplar and the centroid exemplar greater than the elimination threshold.

3. The method as claimed in claim 2, wherein the elimination threshold is determined based on a similarity between one of: the mean exemplar and the centroid exemplar, and a farthest exemplar from the centroid exemplar associated with a respective semantic category.

4. The method as claimed in claim 1, wherein the semantic model associated with each of the probable set of semantic categories is received from a semantic model database.

5. The method as claimed in claim 1, wherein the method further comprises:

determining, by the electronic device, the at least one semantic category associated with the at least one document is changed to at least one new semantic category;

determining, by the electronic device, the at least one semantic category associated with the at least one document is a false positive; and identifying, by the electronic device, the at least one document embedding associated with the at least one document with the at least one new semantic category as an exemplar for the at least one new semantic category.

6. The method as claimed in claim 1, wherein the method further comprises:

determining, by the electronic device, a first semantic category associated with the at least one document is changed to a second semantic category by a user;

determining, by the electronic device, a semantic model associated with the first semantic category and a semantic model associated with the second semantic category; and performing, by the electronic device, one of: automatic updation of the semantic model associated with the first semantic category and the semantic model associated with the second semantic category based on the at least one document; and automatic updation of a plurality of semantic models stored in a semantic models database.

7. The method as claimed in claim 1, wherein the method further comprises:

determining, by the electronic device, a first semantic category associated with the at least one document is changed to a second semantic category by a specific user in a multi-user environment; and automatically updating, by the electronic device, the semantic model associated with the first semantic category and the semantic model associated with the second semantic category based on the at least one document only for the specific user; and retaining the semantic model associated with the first semantic category and the semantic model associated with the second semantic category without any change.

8. The method as claimed in claim 7, wherein the method further comprises:

determining, by the electronic device, a plurality of documents wherein the semantic categories of each of the plurality of documents is determined by one of the semantic model associated with a first semantic category and the semantic model associated with the second semantic category;

executing, by the electronic device, the updated semantic model associated with the first semantic category and the updated semantic model semantic model associated with the second semantic category based on the determined plurality of documents; and automatically updating, by the electronic device, the at least one semantic category associated with each of the determined plurality of documents based on the execution.

9. The method as claimed in claim 1, wherein the method further comprises:

determining, by the electronic device, an aggregate of the plurality of semantic models stored in a semantic models database;

customizing, by the electronic device, the aggregate of the plurality of semantic models stored based on a user preference, wherein the customization is one of: enabling at least one semantic model of the plurality of semantic models, disabling the at least one semantic model of the plurality of semantic models, overwriting parameters associated with the at least one semantic model of the plurality of semantic models; and generating, by the electronic device, a new semantic model based on the customization.

10. An electronic device for automatically assigning at least one semantic category of at least one document, the electronic device comprising:

a memory;

a processor; and a semantic category identifier, operably connected to the memory and the processor, configured to:

receive the at least one document embedding indicating a semantic representation of the at least one document;

determine a probable set of semantic categories of a plurality of semantic categories associated with the at least one document embedding based on an execution of the at least one document embedding on a plurality of proto-models, wherein each proto-model of the plurality of proto-models is a compressed version of a semantic model associated with a respective semantic category, wherein each semantic model comprises a set of vector embeddings of the at least one document used in training at least one semantic category of the plurality of semantic categories;

receive the semantic model associated with each of the probable set of semantic categories;

execute the at least one document embedding on the received semantic model, wherein, to execute the at least one document embedding on the received semantic model, semantic category identifier is configured to:

determine similarity between the at least one document embedding and each embedding of the received semantic model;

determine whether the highest similarity among the similarity between the at least one document embedding and each embedding of the received semantic model, is greater than a model threshold; and convert the highest similarity for each received semantic model that has the highest similarity greater than the respective model threshold, into a confidence score, wherein the confidence score is computed based on a difference between the highest similarity and the respective model threshold, wherein the confidence score is computed as:

Confidence score=$0.5+0.5*(HS-Th)/(1-Th)$ wherein HS is the highest similarity for each received semantic model that has the highest similarity greater than the respective model threshold, and wherein Th is the respective model threshold; and automatically assign the at least one semantic category out of the probable set of semantic categories, of the at least one document embedding, wherein the at least one semantic category is associated with the received semantic model that has the highest confidence score.

11. The electronic device as claimed in claim 10, wherein determine the probable set of semantic categories of the plurality of semantic categories associated with the at least one document embedding based on the execution of the at least one document embedding on the plurality of proto-models comprises:

determine a similarity between the at least one document embedding against one of: a mean exemplar and a centroid exemplar associated with each proto-model of the plurality of proto-models;

determine whether the similarity between the at least one document embedding and one of: the mean exemplar and the centroid exemplar associated with each proto-model of the plurality of proto-models is greater than an elimination threshold; and determine the probable set of semantic categories corresponding to each proto-model of the plurality of proto-models in response to determining that the similarity between the at least one document embedding and one of: the mean exemplar and the centroid exemplar greater than the elimination threshold.

12. The electronic device as claimed in claim 11, wherein the elimination threshold is determined based on a similarity between one of: the mean exemplar and the centroid exemplar, and a farthest exemplar from the centroid exemplar associated with a respective semantic category.

13. The electronic device as claimed in claim 10, wherein the semantic model associated with each of the probable set of semantic categories is received from a semantic model database.

14. The electronic device as claimed in claim 10, wherein the semantic category identifier is configured to:

determine the at least one semantic category associated with the at least one document is changed to at least one new semantic category;

determine the at least one semantic category associated with the at least one document is a false positive; and identify the at least one document embedding associated with the at least one document with the at least one new semantic category as an exemplar for the at least one new semantic category.

15. The electronic device as claimed in claim 10, wherein the semantic category identifier is configured to:

determine a first semantic category associated with the at least one document is changed to a second semantic category by a user;

determine a semantic model associated with the first semantic category and a semantic model associated with the second semantic category; and perform one of: automatic updation of the semantic model associated with the first semantic category and the semantic model associated with the second semantic category based on the at least one document; and automatic updation of a plurality of semantic models stored in a semantic models database.

16. The electronic device as claimed in claim 10, wherein the semantic category identifier is configured to:

determine a first semantic category associated with the at least one document is changed to a second semantic category by a specific user in a multi-user environment; and automatically update the semantic model associated with the first semantic category and the semantic model associated with the second semantic category based on the at least one document only for the specific user; and retaining the semantic model associated with the first semantic category and the semantic model associated with the second semantic category without any change.

17. The electronic device as claimed in claim 10, wherein the semantic category identifier is configured to:

determine a plurality of documents wherein the semantic categories of each of the plurality of documents is determined by one of the semantic model associated with a first semantic category and the semantic model associated with the second semantic category;

execute the updated semantic model associated with the first semantic category and the updated semantic model semantic model associated with the second semantic category based on the determined plurality of documents; and automatically update the at least one semantic category associated with each of the determined plurality of documents based on the execution.

18. The electronic device as claimed in claim 10, wherein the semantic category identifier is configured to:

determine an aggregate of the plurality of semantic models stored in a semantic models database;

customize the aggregate of the plurality of semantic models stored based on a user preference, wherein the customization is one of: enabling at least one semantic model of the plurality of semantic models, disabling the at least one semantic model of the plurality of semantic models, overwriting parameters associated with the at least one semantic model of the plurality of semantic models; and generate a new semantic model based on the customization.

* * * * *